(12) United States Patent
Bruas

(10) Patent No.: US 7,925,218 B2
(45) Date of Patent: Apr. 12, 2011

(54) TOOL AND METHOD FOR PLANNING AND/OR DIMENSIONING SATELLITE TELECOMMUNICATIONS THROUGH A QUALITY INDICATOR

(75) Inventor: Patrick Bruas, Livry-Gargan (FR)

(73) Assignee: Thales (FR)

( * ) Notice: Subject to any disclaimer, the term of this patent is extended or adjusted under 35 U.S.C. 154(b) by 597 days.

(21) Appl. No.: 11/719,025

(22) PCT Filed: Nov. 10, 2005

(86) PCT No.: PCT/EP2005/055889
§ 371 (c)(1),
(2), (4) Date: Jun. 23, 2008

(87) PCT Pub. No.: WO2006/051095
PCT Pub. Date: May 18, 2006

(65) Prior Publication Data
US 2008/0268788 A1    Oct. 30, 2008

(30) Foreign Application Priority Data
Nov. 10, 2004    (FR) ...................................... 04 11984

(51) Int. Cl.
*H04B 17/00*    (2006.01)
(52) U.S. Cl. ...................... 455/67.11; 342/165; 342/173

(58) Field of Classification Search .................. None
See application file for complete search history.

(56) References Cited

U.S. PATENT DOCUMENTS
4,119,964 A    10/1978    Fletcher et al.

OTHER PUBLICATIONS
G. Maral & M.Bousquet: "Satellite Communications Systems" 1997, Wiley, Chichester (GB), XP002339406.

*Primary Examiner* — Zhiyu Luu
(74) *Attorney, Agent, or Firm* — Lowe Hauptman Ham & Berner, LLP

(57) ABSTRACT

Method for planning and/or dimensioning links between several stations in a wireless telecommunication system including the following steps:
a) establishing a relation, in logarithmic scale, for each existing link between the ground equivalent radiated power, $EIRP_{ground}$, the signal to noise density ratio required (C/No)req for a link, and a quality indicator QaF,
b) determining the quality indicator QaF from the contribution of the first type items (link analysis disturbance) that are linear in $EIRP_{ground}$ and the second type items that are non-linear in $EIRP_{ground}$,
c) determining the $EIRP_{ground}$ from the quality indicator QaF determined in step b).

19 Claims, 7 Drawing Sheets

Figure 1:
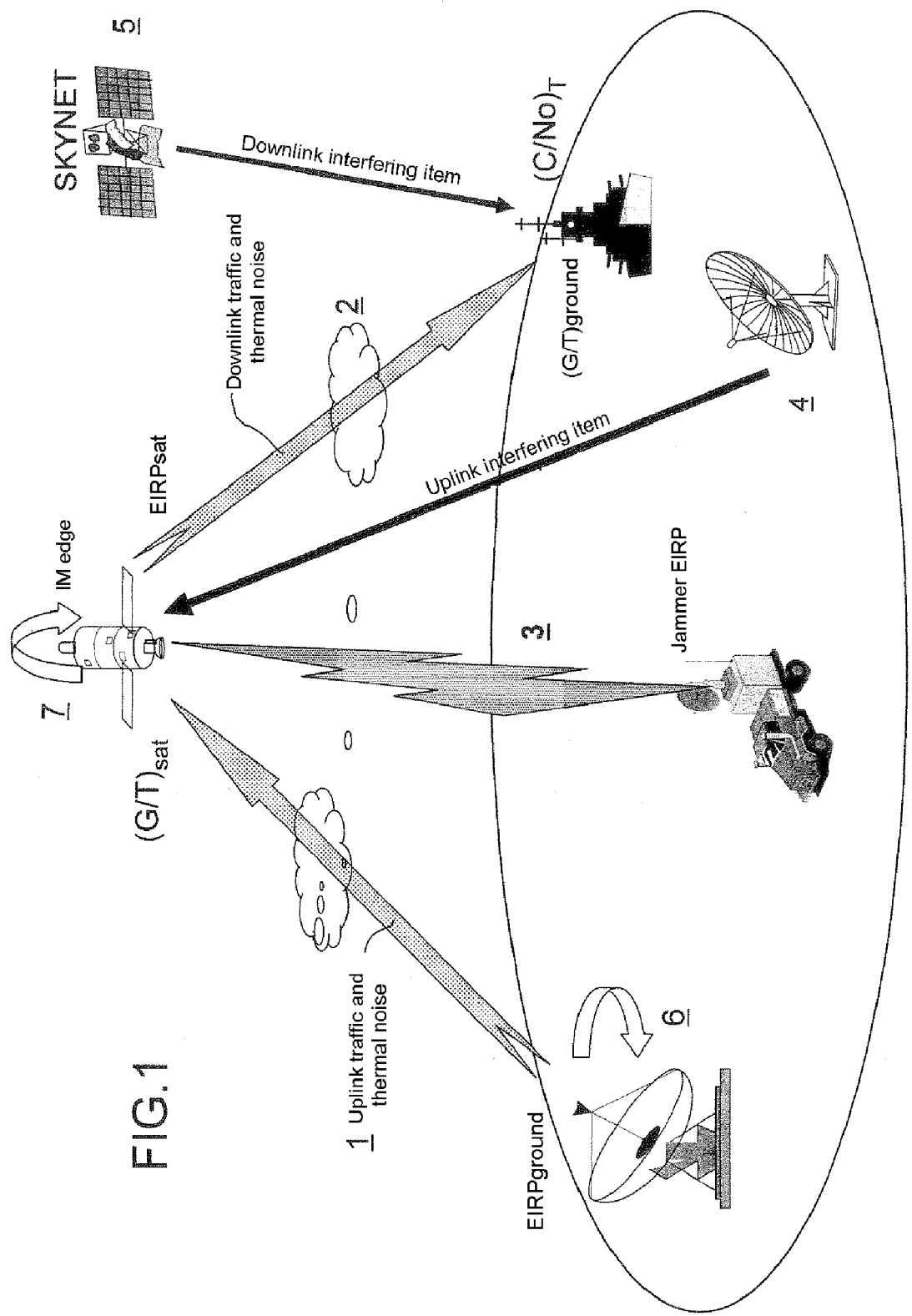

- R1 // R2 = Butterfly (R1,R2,+1) = min (R1,R2) − 10log( 1 + 10^(−Abs(R1−R2)/10) )
- R1 \\ R2 = Butterfly (R1,R2,−1) = min (R1,R2) − 10log( 1 − 10^(−Abs(R1−R2)/10) )

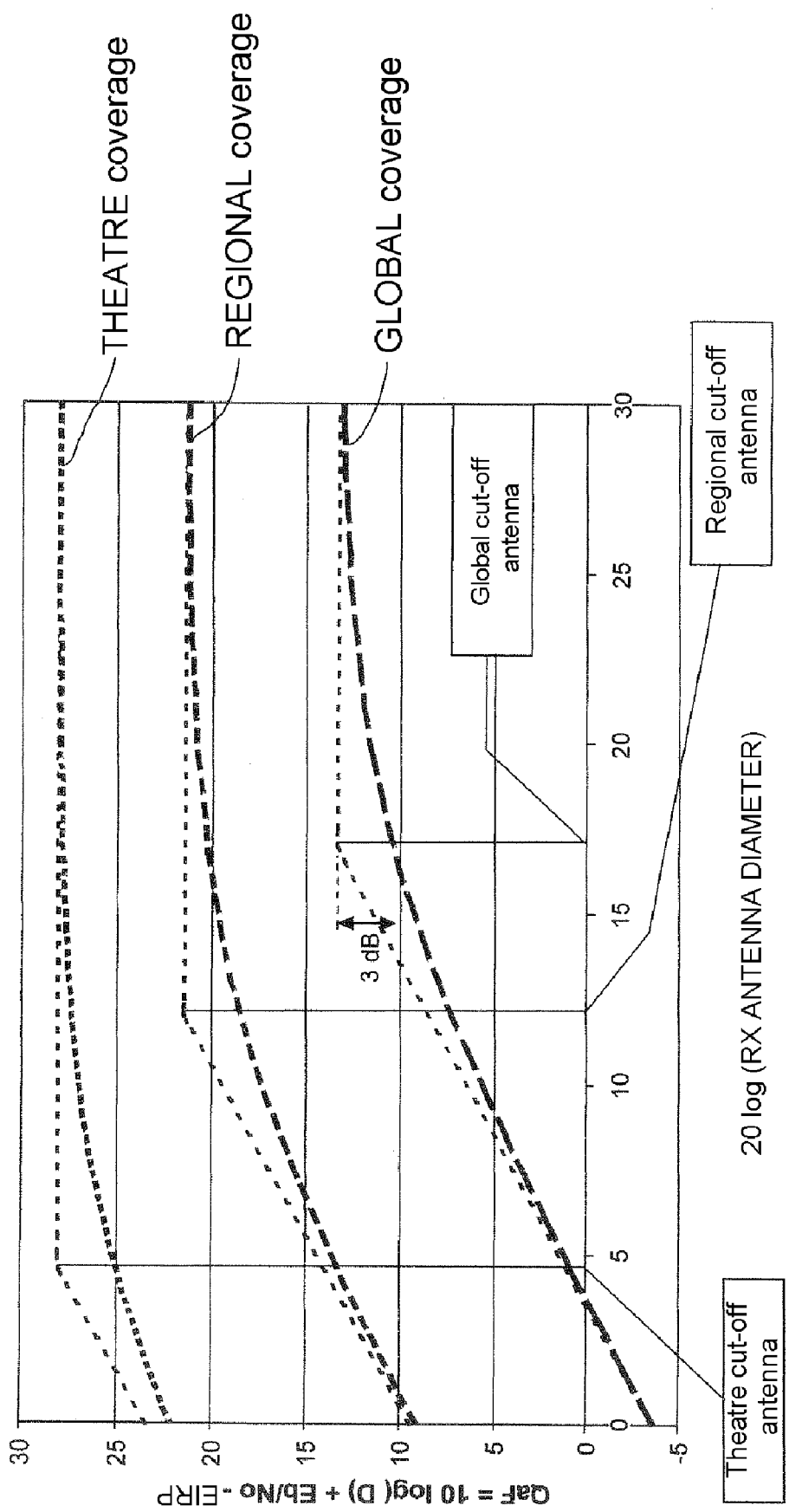

TOOL AND METHOD FOR PLANNING AND/OR DIMENSIONING SATELLITE TELECOMMUNICATIONS THROUGH A QUALITY INDICATOR

CROSS REFERENCE TO RELATED APPLICATIONS

The present Application is based on International Application No. PCT/EP2005/055889, filed on Nov. 10, 2005, which in turn corresponds to France Application No. 04 11984, filed on Nov. 10, 2004, and priority is hereby claimed under 35 USC §119 based on these applications. Each of these applications are hereby incorporated by reference in their entirety into the present application.

The invention relates to a tool to assist in the planning of satellite telecommunication links. It is also used to dimension these links.

Satellite telecommunications are a way of handling high speed traffic between any two subscribers located within the coverage of the edge antenna system, through a transparent repeater, link analysis permitting.

A Satcom link analysis calculation algorithm normally calculates the ground equivalent isotropically radiated power or $EIRP_{ground}$ required for a terrestrial station A, for a given terrestrial station B to receive a total signal to noise density ratio C/No that is required by the link, with a user bit rate D and a bit error ratio BER for a given propagation and interference environment, via a known payload (space segment) and with a certain system margin M.

A Satcom link analysis calculation algorithm normally calculates one of the following quantities:

the ground EIRP in dBW needed for a given pair (D, Eb/No), with Eb being the average energy received per bit of user traffic, or the maximum bit rate D for a given pair (EIRP ground, Eb/No), or the Eb/No needed for a given pair (EIRP ground, D).

The specifications of the modem for the ground segment can be used to calculate the total received average power to noise density ratio C/No required by the demodulator. This ratio is given by the following formula (in logarithmic form):

$$\left(\frac{C}{No}\right)_{req} = \left(\frac{Eb}{No}\right) + 10\log_{10}D + M \quad [E1]$$

The canonical satellite link analysis formula in linear form for a transparent (i.e. non-regenerative) repeater is:

$$\left(\frac{C}{No}\right)_{total}^{-1} = \sum_{k=1}^{n}\left(\frac{C}{No}\right)_{k}^{-1} = (C/No)_{th\_uplink}^{-1} + (C/No)_{th\_downlink}^{-1} + \quad [E2]$$

other terms (e.g.: interference, intermodulation)

The term on the left is calculated from the result of calculating each of the disturbance terms {$(C/No)^{-1}$ of index i} also called items that occur in this inverse sum. The minimum number of items is n=2 with the uplink thermal noise (th_uplink) and downlink thermal noise (th_downlink) terms.

The condition for success of the link analysis is as follows:

$$\left(\frac{C}{No}\right)_{total} = \left(\frac{C}{No}\right)_{req} \quad [E3]$$

According to the methods of the prior art, [E2] is calculated in linear scale after converting each of the items from the logarithmic scale to the linear scale.

Some calculation algorithms of the prior art are based on a reverse calculation, starting from a received C/No point then working back to the satellite EIRP then to the ground EIRP via the operational gain. Then, a convergence loop repeats the calculation until the total C/No is equal to the required C/No.

The link analysis calculation is also used to dimension the stations (in terms of power amplifiers and ground antenna system) for a given payload and a given traffic bit rate.

The invention relies on a novel approach involving a tool and device for calculating link analysis and/or dimensioning a link which consists notably in determining a relevant quality indicator, designated QaF hereinafter in the description. This "total quality figure" is a quality indicator which corresponds to the English acronym QaF, standing for "Quality aggregate Figure".

This quality indicator corresponds to a proportionality factor, expressed in dBHz/W, between the total signal to noise density ratio C/No required for the link and the $EIRP_{ground}$ needed for the carrier of this link. There is therefore an exchange between the $EIRP_{ground}$ and the total signal to noise density ratio C/No required (in dBHz). This exchange is expressed by the relation [E4] mentioned below.

The invention relates to a method for planning and/or dimensioning links between a plurality of station or items, including at least the following steps:

a) using an existing link, in logarithmic scale, to establish a relation between the ground equivalent radiated power, $EIRP_{ground}$, the signal to noise density ratio required (C/No)req for a link, and a quality indicator QaF, b) determining the quality indicator QaF from the contribution of the first type disturbing items that are linear in $EIRP_{ground}$ and the second type items that are non-linear in $EIRP_{ground}$.

The method can include a step c) for determining the $EIRP_{ground}$ from the quality indicator QaF determined in step b).

The invention also relates to a device for planning and/or dimensioning links between a plurality of stations in a telecommunication system, the device being suitable for executing the steps of the method mentioned above.

The method according to the invention in particular offers assistance in the planning and dimensioning of the satellite telecommunication links. In particular, it offers the following advantages:

The quality indicator QaF is independent of the modem and of the $EIRP_{ground}$.

This indicator establishes an exchange relation in particular between the following quantities: bit rate D, Eb/No ratio, system margin, receive antenna surface area and $EIRP_{ground}$ for a given payload (characterized by its coverage, its merit factor (G/T)sat, its saturating flux density SFD and the EIRP at repeater saturation) and for a given propagation and interference environment. This relation is useful when it comes to Satcom network architecture.

Figure 2:
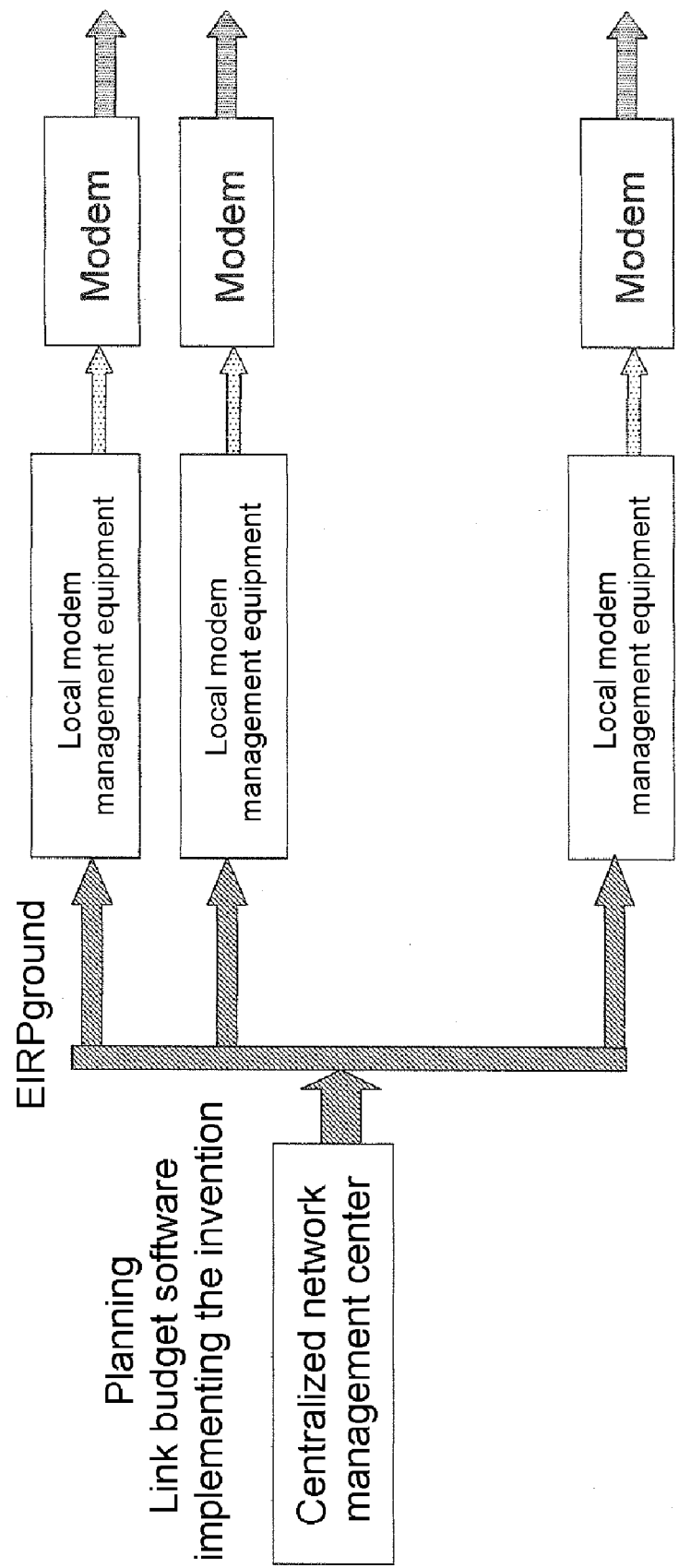
Figure 3:
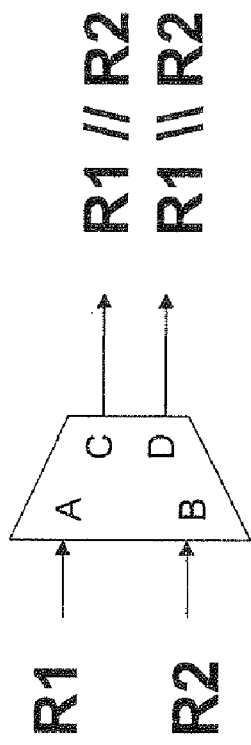
Figure 4:
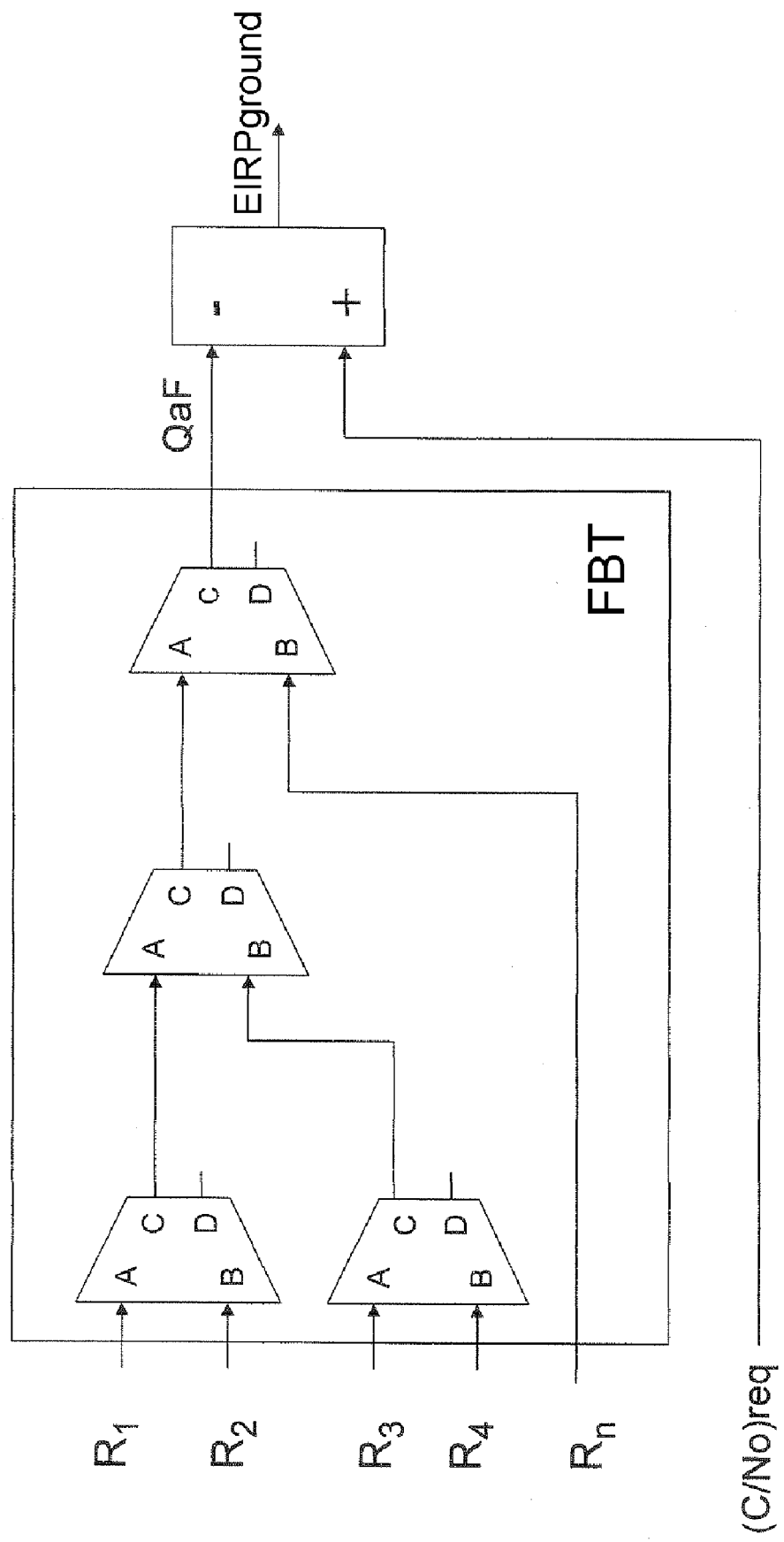
Figure 5:
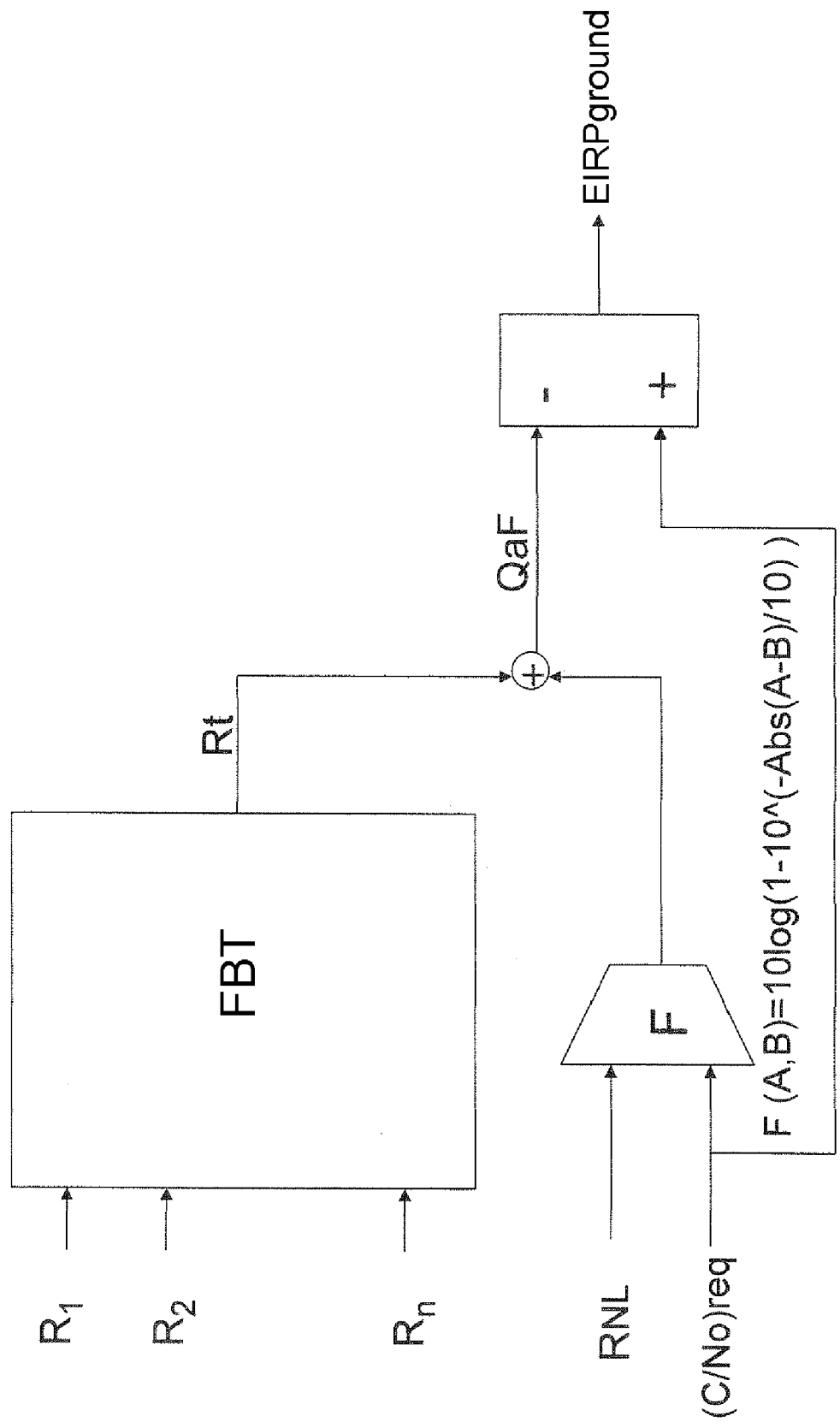
Figure 6:
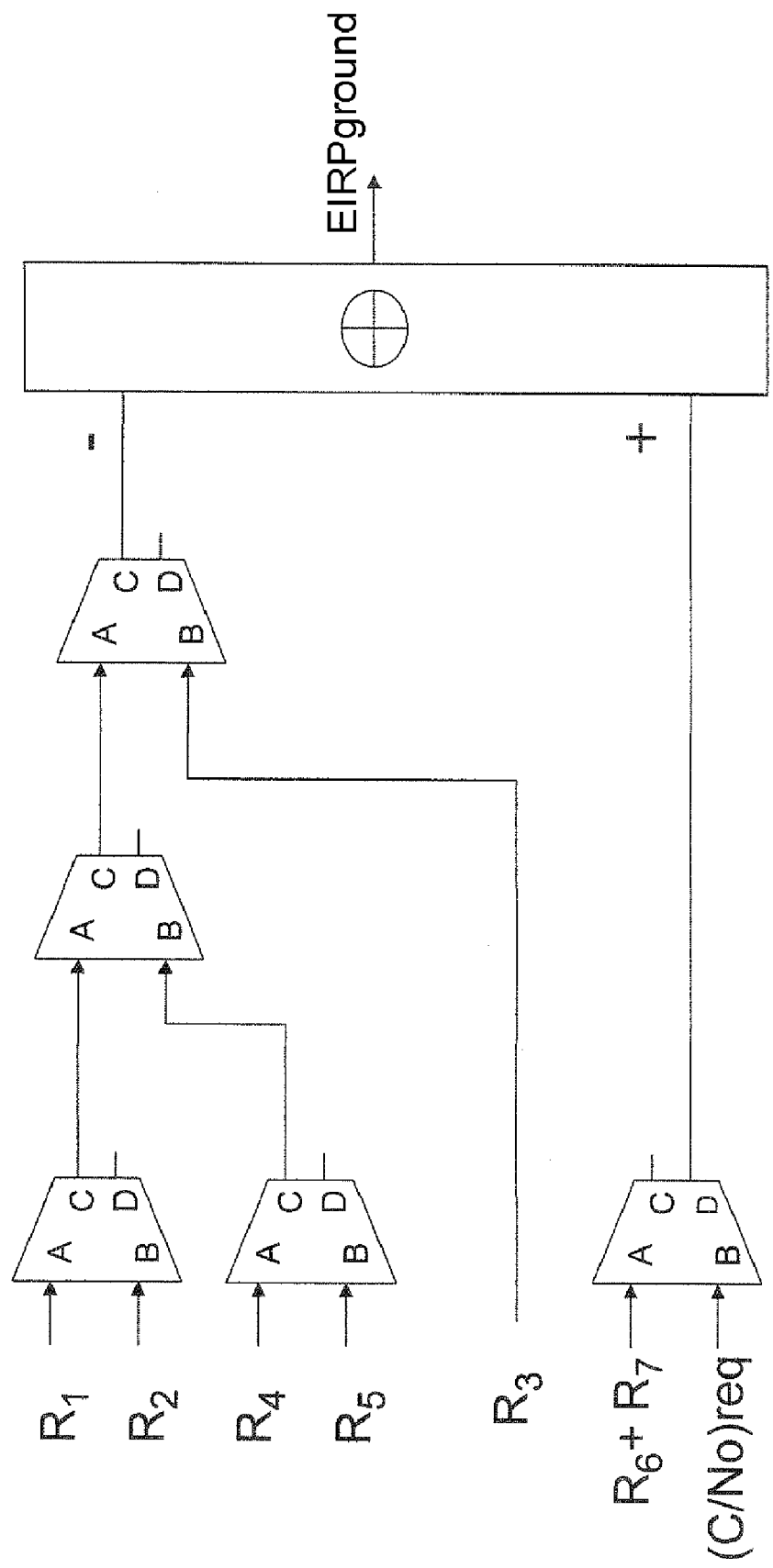

Other characteristics and advantages of the present invention will become more apparent from reading the description that follows of an exemplary embodiment given by way of illustration and by no means limiting, with attached figures which represent:

FIG. 1, an exemplary architecture with a plurality of stations involved in the Satcom link analysis, FIG. 2, a functional block diagram of the method according to the invention, FIG. 3, the structure of the basic "butterfly" operator used in the method, FIG. 4, the architecture of the $EIRP_{ground}$ calculation algorithm with first type terms only, FIG. 5, an exemplary ground EIRP calculation with first and second type terms, FIG. 6, the architecture of the "butterfly" operator for the cases where there are first type and second type terms, FIG. 7, different quality indicator curves according to receive antenna surface areas and satellite coverages.

In order to better understand the invention, the description below is given within the context of a satcom link.

FIG. 1 gives an example of point-to-point links which illustrates the presence of seven disturbing items in the link analysis:

Item 1: $(C/No)_1$=Uplink thermal noise
Item 2: $(C/No)_2$=Downlink thermal noise
Item 3: $(C/No)_3$=Uplink jammer
Item 4: $(C/No)_4$=Uplink adjacent system interference (example: Skynet Terminal)
Item 5: $(C/NO)_5$=Downlink adjacent system interference (example: Skynet Satellite)
Item 6: $(C/No)_6$=Ground segment intermodulation (IM ground)
Item 7: $(C/No)_7$=Space segment intermodulation (IM edge)

FIG. 2 is a functional block diagram of the implementation of the method according to the invention.

The link planning and dimensioning aid tool is, for example, implemented in a centralized network management center 1, or NMC (i.e. the set of communication units (CU) that are endpoints of point-to-point links via one and the same repeater, each communication unit CU physically belonging to a Satcom station). The centralized management center NMC provides the list of $EIRP_{ground}$ values, for each link, that will be distributed to each local management center that is attached to a station. Then, knowing the emitter subsystem gain between the IF (intermediate frequency) output of the station's modem and the station's antenna output, the local management center will convert the $EIRP_{ground}$ into transmit IF power which will be used to configure the modem corresponding to the link. The centralized network management center can, if necessary, provide the operator with aid in graphic and tabular form, showing him the sensitivity of the quality indicator to the following parameters: receive antenna surface area, coverage and/or operational gain of the repeater, interference level, elevation angle of the stations, attenuation margins, etc.

The centralized management center comprises a processor for executing the various steps of the method according to the invention, and the local management centers are also equipped with programmed processors.

Satcom planning notably involves determining the $EIRP_{ground}$ of each link and the consumption of the resources for a given deployment.

To sum up, the satellite telecommunication planning aid method comprises, for example, the following steps:
1—determining the contribution of the items that are linear in $EIRP_{ground}$,
2—determining the contribution of any items that are non-linear in $EIRP_{ground}$,
3—determining the quality indicator QaF from the results of 1 and 2,
4—determining the $EIRP_{ground}$ by taking into account the results of 3 and the (C/No) required.

The quality indicator QaF in practice represents the number of kbps (kilobits per second) of useful information that it is possible to pass per Watt of station EIRP consumed per link. The quality indicator QaF corresponds to an EIRP standardized by calculating the linear scale ratio of the C/No (total signal to noise density ratio) required by the link over the EIRPground.

The method includes a step in which a logarithmic scale relation is established for each link between the $EIRP_{ground}$, the total signal to noise density ratio required by the link and a quality indicator QaF.

$$EIRP_{ground} = \left(\frac{C}{No}\right)_{req} - QaF \quad [E4]$$

The items included in the link analysis can be of two types:

"p" first type terms that are linear in $EIRP_{ground}$,

"n-p" second type terms that are non-linear in $EIRP_{ground}$.

By considering these two types of items, the canonical equation [E2] becomes:

$$\left(\frac{C}{No}\right)_{total}^{-1} = \sum_{i=1}^{p}\left(\frac{C}{No}\right)_i^{-1} + \sum_{j=p+1}^{n}\left(\frac{C}{No}\right)_j^{-1} \quad [E5]$$

To obtain the quality indicator QaF, the method will factorize the $EIRP_{ground}$ in the first type items, unlike the second type items in which the $EIRP_{ground}$ cannot be factorized. The method considers all the first type terms as a product (in linear scale) of the $EIRP_{ground}$ and a parallelizing of the contributions of the various first type items.

To determine the quality indicator values, there is defined a "butterfly" operator (by analogy with the basic Fast Fourier Transform FFT operator). FIG. 3 represents an exemplary structure of this operator.

$$\text{Butterfly}(R_1, R_2, \text{sign}) = \min(R_1, R_2) - 10\log_{10}(1+ \text{sign} \cdot 10^{(-|(R1-R2)/10|)}) \quad [E6]$$

With:

sign=±1 chosen according to the type of the disturbing items.

$R_1$ and $R_2$ are expressed in dBHz/W and correspond to two disturbing items involved in the grouping, Ri is the individual quality factor of the item i, a detailed example is given below in the description.

In the figures, the letters A and B represent the operator inputs and the letters D and C the butterfly operator output.

The algorithms implemented in the planning tool depend on the items concerned.

For the Linear Items

The items are grouped in pairs and the sign +1 is used in the operator designated "butterfly"

$$R1//R2 = \text{Butterfly}(R1, R2, +1) \quad [E7]$$

with a repetition of the recurrent "Butterfly" pattern until the items are used up to synthesize all the contributions of the first type items, represented Rt.

For the Non-Linear Items Grouped in a Single Term $R_{NL}$ $$EIRPground = -Rt + \text{Butterfly}((C/No)req, R_{NL}, -1) \quad [E8]$$

with $$\left(\sum_{j=p+1}^{n}\left(\frac{C}{No}\right)_j^{-1}\right)^{-1} = R_{NL}$$

FIG. 4 represents the use of the butterfly operator to determine the link analysis in the case where there are only first type items. The method, knowing the value $(C/NO)_{req}$ determines the $EIRP_{ground}$ value using the relation [E4] and the following formula obtained by using the relation [E7]:

$$QaF = R1//R2//\ldots//Rn \quad [E9]$$

FIGS. 5 and 6 represent the use of the operator to determine the link analysis in the case where first type items and second type items coexist in the system. The method can determine the $EIRP_{ground}$ in two equivalent ways:
either using the relation [E4] and the following two relations (see FIG. 5):

$$Rt = R1 // R2 // \ldots // Rp \quad [E10]$$
obtained using [E7]

$$QaF = Rt(1 - \rho/R_{NL}) \text{ in linear scale with } \rho = \left(\frac{C}{No}\right)_{req} \quad [E11]$$

or using the relations [E10] and [E8] explained later in the description (see FIG. 6).

FIGS. 4, 5 and 6 show an exemplary concatenation of the basic "Butterfly" operator. The result of this concatenation is called "Fast Butterfly Transform", or FBT, in FIG. 5. This transform is applied only to the first type items.

FIG. 6 shows an example of how $EIRP_{ground}$ is calculated for a set of seven disturbing items, with five first type items and two second type items. The $EIRP_{ground}$ value is obtained by applying the relation [E8].

From the implementation variants described above, it emerges that:

The greater the QaF, the lower the EIRP required at fixed useful bit rate D (or in an equivalent manner, the greater the bit rate D at fixed EIRP), A zero QaF (i.e. same EIRP figure as C/No required) is obtained for a jammer of transmit density 0 dBW/Hz (for example: 76 dBW spread in a repeater of 40 MHz bandwidth), A negative QaF (i.e. EIRP figure>C/No figure required) is obtained for a stronger jammer spread in the same repeater band.

According to one implementation variant, the quality indicator is used to dimension the links and in particular the receive antennas.

For this, the method proceeds, for example, with the steps described below:

The quality indicator QaF is expressed as a function of the receive antenna surface area of a station. This gives a curve that can be likened to a high-pass Butterworth filter defined by a slope, a gain and a −3 dB cut-off antenna.

The individual quality factor of the downlink interference item $R_2$ is expressed in the following logarithmic form:

$$R_2 = R_1 + 20 \log_{10}\left(\frac{\phi}{\phi_{-3}}\right) \quad [E12]$$

with:
$R_1$ being the individual quality factor of the uplink thermal term item=gain of the filter in the bandwidth.
$\emptyset$ being the diameter of the antenna of the receiving station
$\emptyset_{-3}$ being the parameter called diameter of the −3 dB cut-off antenna.

From this, the "frequency" response of the abovementioned filter $R_1//R_2$ can be deduced in linear scale:

$$QaF = R_1\left(\frac{\phi^2}{\phi^2 + \phi_{-3}^2}\right) \quad [E13]$$

The calculating and the appearance of the filter can be generalized to N disturbance terms of the link analysis.

The log-log scale of FIG. 7 reveals two areas:
An area where the antenna diameter is greater than the −3 dB cut-off antenna diameter: the uplink thermal noise is dominant and it is that which imposes the analysis,
An area where the antenna diameter is less than the −3 dB cut-off antenna diameter: the downlink thermal noise is dominant.

If the receive ground antenna diameter is equal to the −3 dB cut-off antenna diameter, then the linear relation QaF=0.5 R1 applies and there is a balance between the uplink thermal noise disturbance and the downlink thermal noise disturbance.

Each QaF variation curve (according to the square of the diameter of the receive antenna) can be parameterized by:
the coverage of the satellite channel and/or the operational gain of the repeater,
the friend and/or enemy interference level,
the elevation angle of the stations and/or the total noise temperature,
etc.

These curves are configurable and presented at the request of the operator in order for the latter to choose, from the value field determined by the calculation tool according to the invention, the relevant combinations of dimensioning parameter values that respond to the operational requirement (for example: bit rates, BER and jammer level) and to the degrees of freedom of the future network to be deployed (for example: coverage and installed base of ground antennas).

The exemplary practical application that follows is given in an illustrative and by no means limiting manner, in order to provide a better understanding of how the various steps of the method according to the invention proceed.

Table 1 gives the quantities on the link analysis in the field of space telecommunications.

All the following quantities are either calculated by the tool or entered by the user, apart from the Boltzman constant.

TABLE 1

| Quantity | Notation | unit | Space segment | Ground segment |
|---|---|---|---|---|
| Uplink attenuation | $A_{up}$ | dB | ● | ● |
| Downlink attenuation | $A_{down}$ | dB | ● | ● |
| Geographic advantage of the transmit station | $AvGeo_{up}$ | dB | ● | ● |

TABLE 1-continued

| Quantity | Notation | unit | Space segment | Ground segment |
|---|---|---|---|---|
| Geographic advantage of the receive station | $AvGeo_{down}$ | dB | ● | ● |
| Boltzman constant | $10\log K = -228.6$ | dBW/Hz/K | | |
| Received power at saturation by the satellite antenna at edge of area | $C_{in\_saturationBZ}$ | dBW | ● | |
| Saturating flux density at edge of area | $DFS_{BZ}$ | dBW/m² | ● | |
| EIRP of a carrier transmitted by the satellite | $EIRP_{sat}$ | dBW | ● | |
| Power received by the satellite antenna | $C_{in}$ | dBW | ● | |
| Operational gain of the repeater | $G_{op}$ | dB | ● | |
| EIRP of a carrier transmitted by the satellite at edge of area | $EIRP_{satBZ}$ | dBW | ● | |
| Merit factor of the station's Rx antenna | $(G/T)_{ground}$ | dBi/K | | ● |
| Free space attenuation (f.s.) | $A_{el}$ | dB | ● | ● |
| Non free space attenuation or attenuation margin on descent | $M_{down}$ | dB | ● | ● |
| Receive system temperature | $T_{sys}$ | K | | ● |
| Receive antenna efficiency | η | adimensional | | ● |
| Receive antenna diameter | Ø | meter | | ● |
| Distance between the satellite and a station | d | meter | | ● |

Uplink Thermal Noise Disturbance:

$$P_1 = (C/No)_1 = EIRP_{ground} - A_{up} + (G/T)_{satBZ} + AvGeo_{up} - 10 \log K \quad [E14]$$

The following linear and uniform relation then applies:

$$R_1 = Gain = \left(\frac{G}{T}\right)_{satBZ} \frac{AvGeo_{up}}{A_{up}K} \quad [E15]$$

Characteristics of the Transparent Repeater:

The characteristics given in the transparent repeater specifications are usually as follows:

TABLE 2

| Quantity | notation | Unit |
|---|---|---|
| Merit factor of the satellite Rx antenna at edge of area | $(G/T)_{satBZ}$ | dBi/K |
| Satellite EIRP at saturation at edge of area | $EIRP_{saturationBZ}$ | dBW |
| Input back-off | IBO | dB |
| Output back-off | OBO | dB |
| Minimum saturating flux density at edge of area | $DFS_{BZmin}$ | dBW/m² |
| Wavelength of carrier on uplink | $\lambda_{up}$ | m |
| Attenuation relative to maximum gain | ATNsat | dB |

In the linear or quasi-linear area of the repeater, the operational gain Gop (here including the antenna radiation patterns) is supplied by the following relation in logarithmic scale:

$$(EIRP_{saturationBZ} - OBO) = (C_{in\_saturationBZ} - IBO) + G_{opBZ}$$

with:

$$C_{in\_saturationBZ} = DFS_{BZ} - 10 \log(4\pi/\lambda_{up}^2)$$

$$DFS_{BZ} = DFS_{BZmin} + ATNsat$$

there is also the relation in logarithmic scale:

$$EIRP_{sat} = C_{in} + G_{op}$$

with:

$$C_{in} = EIRP_{ground} - A_{up}$$

$$G_{op} = G_{opBZ} + AvGeo_{up} + AvGeo_{down}$$

hence the following two relations in logarithmic scale:

$$EIRP_{sat} = EIRP_{ground} - A_{up} + AvGeo_{up} + AvGeo_{down} + G_{opBZ} \quad [E16]$$

$$G_{opBZ} = EIRP_{saturationBZ} - OBO + IBO - DFS_{BZmin} - ATN_{sat} + 10\log(4\pi/\lambda_{up}^2) \quad [E17]$$

Downlink Thermal Noise Disturbance:

$$P_2 = (C/No)_2 = EIRP_{satBZ} - A_{down} + (G/T)_{ground} + AvGeo_{down} - 10\log K \quad [E18]$$

with:

$$EIRP_{sat} = EIRP_{satBZ} + AvGeo_{down}$$

The combination of [E16] and [E18] gives:

$$P_2 = EIRP_{ground} - A_{up} - A_{down} + AvGeo_{up} + AvGeo_{down} + G_{opBZ} + (G/T)_{ground} - 10\log K \quad [E19]$$

Moreover, $(G/T)_{ground}$ can be calculated by separating the two terms:
T=temperature of the system $T_{sys}$ in receive mode (see state of the art)
G=receive antenna gain.

If $(G/T)_{ground}$ is calculated at the input of the station's low noise amplifier LNA, then the line losses denoted $L_{line}$ between the foot of the antenna and the LNA must be subtracted from the receive antenna gain.

The free space attenuation $A_{f.s.}$ on the downlink path is then combined with the receive ground antenna gain G so that the wavelength of the down carrier disappears.

The free space attenuation formula (in linear scale) is reviewed below:

$$A_{f.s.} = \left(\frac{\lambda}{4\pi d}\right)^2 \quad [E20]$$

For a parabolic antenna of diameter Ø and of efficiency η, the receive gain in the axis is (in linear scale):

$$G = \eta \frac{4\pi S}{\lambda^2} = \eta\left(\frac{\pi\emptyset}{\lambda}\right)^2 \quad [E21]$$

From this, the following can be deduced:

$$A_{f.s.}G = \eta\left(\frac{\emptyset}{4d}\right)^2 \quad [E22]$$

This relation is independent of the frequency.

By combining the relations [E19] and [E22], the following relation in logarithmic scale is obtained:

$$P_2 = EIRP_{ground} - A_{up} - M_{down} + AvGeo_{up} + AvGeo_{down} + G_{opBZ} - 10 \log T_{sys} - 10 \log K + 10 \log \eta - 20 \log d - 12 \text{ dB} + 20 \log \emptyset - L_{line}$$

with:

d=distance between the satellite and the receiving station. The term "−3 dB cut-off antenna" is used to denote the receive antenna diameter denoted $\emptyset_{-3}$ which corresponds to the balance $R_1 = R_2$.

By stating the following equation in logarithmic form:

$$20 \log \emptyset_{-3} = (G/T)_{satBZ} + M_{down} - AvGeo_{down} - G_{opBZ} + 10 \log T_{sys} - 10 \log \eta + 20 \log d + 12 \text{ dB} + L_{line} \quad [E23]$$

the following is obtained:

$$R_2 = R_1 + 20 \log \emptyset - 20 \log \emptyset_{-3} \quad [E12] \text{ (already cited)}$$

and the uniform equivalent relation in linear form applies:

$$(\emptyset_{-3})^2 = \left(\frac{G}{T}\right)_{satBZ} \frac{16 d^2 T_{sys} M_{down} L_{line}}{G_{op} BZ \eta AvGeo_{down}} \quad [E24]$$

$R_1 // R_2$ is simplified from the ratio $\emptyset / \emptyset_{-3}$ and from the Butterfly operator, by factorizing $R_1$.

By plotting in log-log scale the curve $R_1 // R_2$ versus $20 \log \emptyset$, a high-pass filter is obtained in the domain of the antenna surface areas with a cut-off antenna $\emptyset_{-3}$, a gain corresponding to the asymptotic value $R_1$, and an area attenuated by asymptote $R_2 = a + b\emptyset^2$, or a slope of 10 dB per decade or 3 dB per octave if the X axis is graduated in $20 \log(\emptyset)$.

More generally, the method according to the invention can be used in any link dimensioning. The dimensioning entails in particular finding good trade-offs between the following quantities:

a) the repeater operational gains (linked to the coverage and therefore to the edge antennas, and to an edge attenuator setting),
b) the antenna size of the installed base of ground segment stations,
c) the ground EIRP per link (linked with the antenna size which gives the station EIRP and the number of links),
d) the user bit rate per link (linked with the Eb/No performance of the ground modem),
e) the friend interference level (compliance with ITU coordination agreements or intergovernmental agreements) or enemy interference level (jammer).

To assist an operator of the network management and planning center in finding a good dimensioning, the method according to the invention has the particular advantage of presenting to the operator:

i) an indicator independent of the points c) and d); it is the QaF which establishes the EIRPground, D, Eb/No and Margin exchange relation,
ii) The sensitivity of this indicator to the points a), b) and e): it is the family of QaF variation curves which is doubly parameterized by the coverage (operational gain of the payload) and the threat/interference level.

Without departing from the scope of the invention, the method also applies in a system using an aircraft as communication node, either in transparent mode (onboard repeater), or in non-transparent mode (onboard processing). The aircraft is, for example, a drone or an airplane, helicopter or any other device having the same functions. The relations [E1] to [E4] previously introduced are used, except for the relation [E4] in which the extreme right term takes into account the separation of the uplink and downlink analysis if the repeater is non-transparent. Other interference terms will be added.

The invention claimed is:

1. A method for planning and/or dimensioning links between a plurality of stations or items in a wireless telecommunication system comprising the following steps:

a) using an existing link, in logarithmic scale, to establish a relation between the ground equivalent radiated power, EIRPground, the signal to noise density ratio required (C/No)req for a link, and a quality indicator QaF, $$EIRP_{ground} = \left(\frac{C}{No}\right)_{req} - QaF$$

where C/No corresponds to the total signal to noise density ratio;

b) determining the quality indicator QaF from the contribution of the first type disturbing items that are linear in EIRPground and the second type items that are non-linear in EIRPground, using:

$$\left(\frac{C}{No}\right)_{total}^{-1} = \sum_{i=1}^{p} \left(\frac{C}{No}\right)_i^{-1} + \sum_{j=p+1}^{n} \left(\frac{C}{No}\right)_j^{-1}$$

where p corresponds to the first type terms that are linear in EIRPground and "n-p" to the second type terms that are non-linear in EIRPground, and c) determining the EIRPground by taking into account the quality indicator obtained and the $C/N_0$ required.

2. The method as claimed in claim 1, wherein, to determine the quality indicator QaF in the case of first type items, the first type items are grouped in pairs and the operator Butterfly($R_1$, $R_2$, sign)=min ($R_1$, $R_2$)−10 $\log_{10}(1+ \text{sign} \cdot 10^{(-|(R1-R2)/10|)})$ is applied, with sign=+1, and this operator is repeated until there are no more first type items.

3. The method as claimed in claim 1, wherein, to determine the EIRPground for a network comprising first type items and second type items, the relation established in step a) is used, together with the following two relations:

$$Rt = R1 // R2 // \ldots // Rp \quad [E10]$$

obtained by using Butterfly ($R_1$, $R_2$, sign)=min ($R_1$, $R_2$)−10 $\log_{10}(1+\text{sign} \cdot 10^{(-|(R1-R2)/10|)})$, with sign=+1

$$QaF = Rt(1 - \rho/R_{NL}) \text{ with } \rho = \left(\frac{C}{No}\right)_{req}$$

4. The method as claimed in claim 3, wherein, to obtain the EIRPground, the following is used:

$$EIRPground = -Rt + Butterfly((C/No)req, R_{NL}, -1)$$

Where Butterfly($R_1$, $R_2$, sign)=min ($R_1$, $R_2$)−10 $\log_{10}(1+\text{sign} \cdot 10^{(-|(R1-R2)/10|)})$, and $$\left(\sum_{j=p+1}^{n} \left(\frac{C}{No}\right)_j^{-1}\right)^{-1} = R_{NL}$$

5. The method as claimed in claim 1, wherein the system comprises a satellite (i.e. transparent repeater), the stations comprise a Satcom antenna (transmit and receive), the quality indicator is expressed as a function of the receive antenna surface area of a station and the area where the uplink thermal noise is dominant and an area where the downlink thermal noise is dominant are defined, an area being associated with an antenna diameter.

6. The method as claimed in claim 1, wherein the telecommunication system is a regenerative satellite (i.e., with onboard processing) and the uplink and the downlink are treated separately, each with one or several disturbing items in the analysis of its link.

7. The method as claimed in claim 1, wherein the telecommunication system comprises a terrestrial segment with stations communicating with each other and an air segment which serves as a communication relay.

8. A device for dimensioning and/or planning the links between a plurality of stations in a wireless telecommunication system comprising, the central station and the remote stations being equipped with a processor suitable for executing the steps of claim 1.

9. The method as claimed in claim 2, wherein the telecommunication system is a regenerative satellite (i.e., with onboard processing) and the uplink and the downlink are treated separately, each with one or several disturbing items in the analysis of its link.

10. The method as claimed in claim 3, wherein the telecommunication system is a regenerative satellite (i.e., with onboard processing) and the uplink and the downlink are treated separately, each with one or several disturbing items in the analysis of its link.

11. The method as claimed in claim 4, wherein the telecommunication system is a regenerative satellite (i.e., with onboard processing) and the uplink and the downlink are treated separately, each with one or several disturbing items in the analysis of its link.

12. The method as claimed in claim 2, the telecommunication system comprises a terrestrial segment with stations communicating with each other and an air segment which serves as a communication relay.

13. The method as claimed in claim 3, the telecommunication system comprises a terrestrial segment with stations communicating with each other and an air segment which serves as a communication relay.

14. The method as claimed in claim 4, the telecommunication system comprises a terrestrial segment with stations communicating with each other and an air segment which serves as a communication relay.

15. A device for dimensioning and/or planning the links between a plurality of stations in a wireless telecommunication system comprising, the central station and the remote stations being equipped with a processor suitable for executing the steps of claim 2.

16. A device for dimensioning and/or planning the links between a plurality of stations in a wireless telecommunication system comprising, the central station and the remote stations being equipped with a processor suitable for executing the steps of claim 3.

17. A device for dimensioning and/or planning the links between a plurality of stations in a wireless telecommunication system comprising, the central station and the remote stations being equipped with a processor suitable for executing the steps of claim 4.

18. A device for dimensioning and/or planning the links between a plurality of stations in a wireless telecommunication system comprising, the central station and the remote stations being equipped with a processor suitable for executing the steps of claim 5.

19. A device for dimensioning and/or planning the links between a plurality of stations in a wireless telecommunication system comprising, the central station and the remote stations being equipped with a processor suitable for executing the steps of claim 6.

\* \* \* \* \*